United States Patent
Kumar et al.

(10) Patent No.: US 9,787,769 B2
(45) Date of Patent: Oct. 10, 2017

(54) POWER AND NETWORK TRAFFIC OPTIMIZATION IN COMMUNICATION SYNCHRONIZATION

(71) Applicant: Oracle International Corporation, Redwood Shores, CA (US)

(72) Inventors: Saurabh Kumar, Hyderabad (IN); Sakshi Kataria, New Delhi (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 455 days.

(21) Appl. No.: 14/451,155

(22) Filed: Aug. 4, 2014

(65) Prior Publication Data

US 2016/0036911 A1  Feb. 4, 2016

(51) Int. Cl.
*H04L 29/08* (2006.01)
*H04L 12/58* (2006.01)
*H04L 29/06* (2006.01)

(52) U.S. Cl.
CPC .......... *H04L 67/1095* (2013.01); *H04L 51/22* (2013.01)

(58) Field of Classification Search
CPC ...... H04L 67/1095; H04L 51/22; H04L 67/42
USPC ........................................................ 709/203
See application file for complete search history.

(56) References Cited

U.S. PATENT DOCUMENTS

| | | |
|---|---|---|
| 6,983,308 B1 | 1/2006 | Oberhaus et al. |
| 7,536,440 B2 | 5/2009 | Budd et al. |
| 8,407,298 B2 | 3/2013 | Kamat et al. |
| 2006/0277257 A1* | 12/2006 | Kromann ............... H04L 12/583 709/206 |
| 2008/0294729 A1 | 11/2008 | Ionescu et al. |
| 2014/0289428 A1* | 9/2014 | Walter ................... G06Q 10/10 709/248 |

FOREIGN PATENT DOCUMENTS

| | | |
|---|---|---|
| EP | 1929722 A1 | 6/2008 |
| EP | 2405618 B1 | 11/2013 |

OTHER PUBLICATIONS

Unknown, "iPad Email Help—Setting Up and Troubleshooting Mail," iPad Email Help Aug. 10, 2010 retrieved from http://ipadhelp.com/ipad-help-tips-tricks/ipad-email-help/ on Dec. 11, 2013, 33 pages.

Unknown, "How do I Set Up POP/IMAP Email on my Samsung Galaxy S®4?" How-to Guides Updated Dec. 4, 2013, retrieved from http://www.samsung.com/us/support/howtoguide/N0000003/10138/120543 en Dec. 11, 2013, 12 pages.

(Continued)

*Primary Examiner* — Tu Nguyen
(74) *Attorney, Agent, or Firm* — Kilpatrick Townsend & Stockton LLP

(57) ABSTRACT

A method of syncing emails between an email server and a client device may include storing a plurality of emails for a user account. The method may also include receiving a request to sync emails between the email server and the client device. The request may include one or more discrete time intervals. The method may additionally include selecting, from the plurality of emails, emails associated with the one or more discrete time intervals. The method may further include sending at least some of the emails associated with the one or more time discrete intervals to the client device.

19 Claims, 13 Drawing Sheets

(56) References Cited

OTHER PUBLICATIONS

Unknown, "POP is bad. IMAP is good," retrieved from http://www.pop2imap.com/ on Dec. 10, 2013, 3 pages.
Prospero, "How to Use Mail in iOS 7," Laptop Reviews Sep. 18, 2013, retrieved from http://blog.laptopmag.com/how-to-use-mail-in-ios-7 on Dec. 9, 2013, 8 pages.
Unknown, "How to change the email syncing frequency on my Samsung Galaxy S II," Updated May 21, 2013, retrieved from http://support.bell.ca/Mobility/Smartphones_and_mobile_internet/Samsung-Galaxy-S3.how_to_change_the_email_syncing_frequency_on_my on Dec. 9, 2013, 1 page.
Unknown, "Synchronize offline folders," retrieved from http://office.microsoft.com/en-in/outlook-help/synchronize-offline-folders-HP005242273.aspx Dec. 9, 2013, 1 page.
Unknown, "GCM Advanced Topics," Android Developers, retrieved from http://developer.android.com/google/gcm/adv.html#top on Dec. 9, 2013, 6 pages.
Xu, et al. "Optimizing Background Email Sync on Smartphones," Microsoft Research Asia, Beijing, China, Jun. 25-28, 2013, retrieved from http://research.microsoft.com/en-us/um/people/moscitho/Publications/MobiSys_2013.pdf, 14 pages.
Unknown, "Mobile Access," retrieved from http://www.icewarp.com/support/online_help/11.0/content/4170.htm on Dec. 9, 2013, 5 pages.
Kononen, "Optimizing Power Consumption of Always-On Applications Based on timer Alignmnent," VTT Technical Research of Finland, Jan. 8, 2011, retrieved from http://www.ee.iitb.ac.in/student/~sripada/COMSNETS16_114PM/comsnets11/papers/1569367267.pdf, 8 pages.

\* cited by examiner

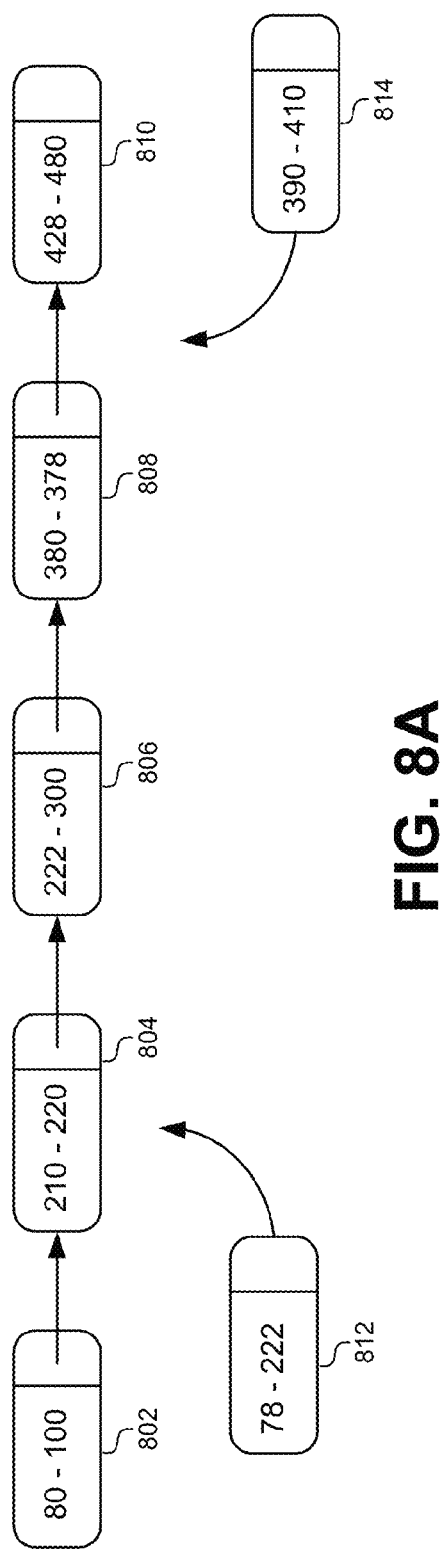
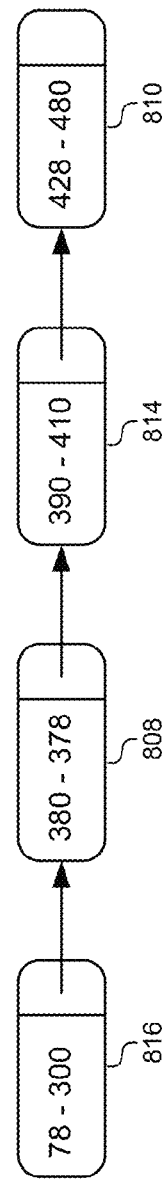
FIG. 8A
FIG. 8B

POWER AND NETWORK TRAFFIC OPTIMIZATION IN COMMUNICATION SYNCHRONIZATION

BACKGROUND

Managing large businesses may involve storing, aggregating, and analyzing large amounts of data. Many organizations use Enterprise Software Systems to manage almost every form of business data. For example, Enterprise Software Systems can provide business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and enterprise forms automation.

Many Enterprise Software Systems may use e-mail servers to store e-mails for employees. These e-mails may be accessed generally by client devices owned by or distributed to the employees. E-mails can generally be synced between the client device and an enterprise e-mail server. This allows users to view, compose, and delete e-mails on client devices while keeping a master copy of the e-mails at the e-mail server. The e-mail server can receive e-mails sent from other users and sync the new e-mails with the client device when appropriate.

BRIEF SUMMARY

In one embodiment, a method of syncing emails between an email server and a client device may be presented. The method may include storing a plurality of emails for a user account. The method may also include receiving a request to sync emails between the email server and the client device. The request may include one or more discrete time intervals. The method may additionally include selecting, from the plurality of emails, emails associated with the one or more discrete time intervals. The method may further include sending at least some of the emails associated with the one or more time discrete intervals to the client device.

In another embodiment, a non-transitory computer-readable medium may be presented. The computer-readable memory may include instructions which, when executed by one or more processors, cause the one or more processors to perform operations including storing a plurality of emails for a user account. The operations may also include receiving a request to sync emails between the email server and the client device. The request may include one or more discrete time intervals. The operations may additionally include selecting, from the plurality of emails, emails associated with the one or more discrete time intervals. The operations may further include sending at least some of the emails associated with the one or more time discrete intervals to the client device.

In yet another embodiment, an intermediate server may be presented. The server may include one or more processors and a memory communicatively coupled with and readable by the one or more processors. The memory may include instructions which, when executed by the one or more processors, cause the one or more processors to perform operations including storing a plurality of emails for a user account. The operations may also include receiving a request to sync emails between the email server and the client device. The request may include one or more discrete time intervals. The operations may additionally include selecting, from the plurality of emails, emails associated with the one or more discrete time intervals. The operations may further include sending at least some of the emails associated with the one or more time discrete intervals to the client device.

Various embodiments may include any of the following features in any combination without limitation. The method described above may be carried out by a e-mail server or by an intermediate e-mail server. The intermediate e-mail server may sync the plurality of e-mails with the e-mail server. The method/operations may also include storing a data structure comprising discrete time intervals that have been previously associated with sync requests from the client device, and updating the data structure to include the one or more discrete time intervals. The one or more discrete time intervals may include a plurality of non-contiguous time intervals. The one or more discrete time intervals may include at least one discrete time interval that does not include a current time. The one or more discrete time intervals may include at least one discrete time interval that less than one day. The one or more discrete time intervals may include at least one discrete time interval that is designated in a number of hours. The at least some of the emails associated with the one or more time discrete intervals that are sent to the client device may include only unread emails. The data structure may include a tree data structure comprising a plurality of nodes, each of the plurality of nodes may represent one of the discrete time intervals, and each of the discrete time intervals may be represented by a start time and an end time. Alternatively or additionally, the data structure may include a tree data structure comprising a plurality of nodes.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 8A illustrates a linked list data structure for storing discrete time intervals, according to some embodiments.

FIG. 8B illustrates the linked list data structure after new discrete time interval nodes have been inserted, according to some embodiments.

DETAILED DESCRIPTION

Figure 1:
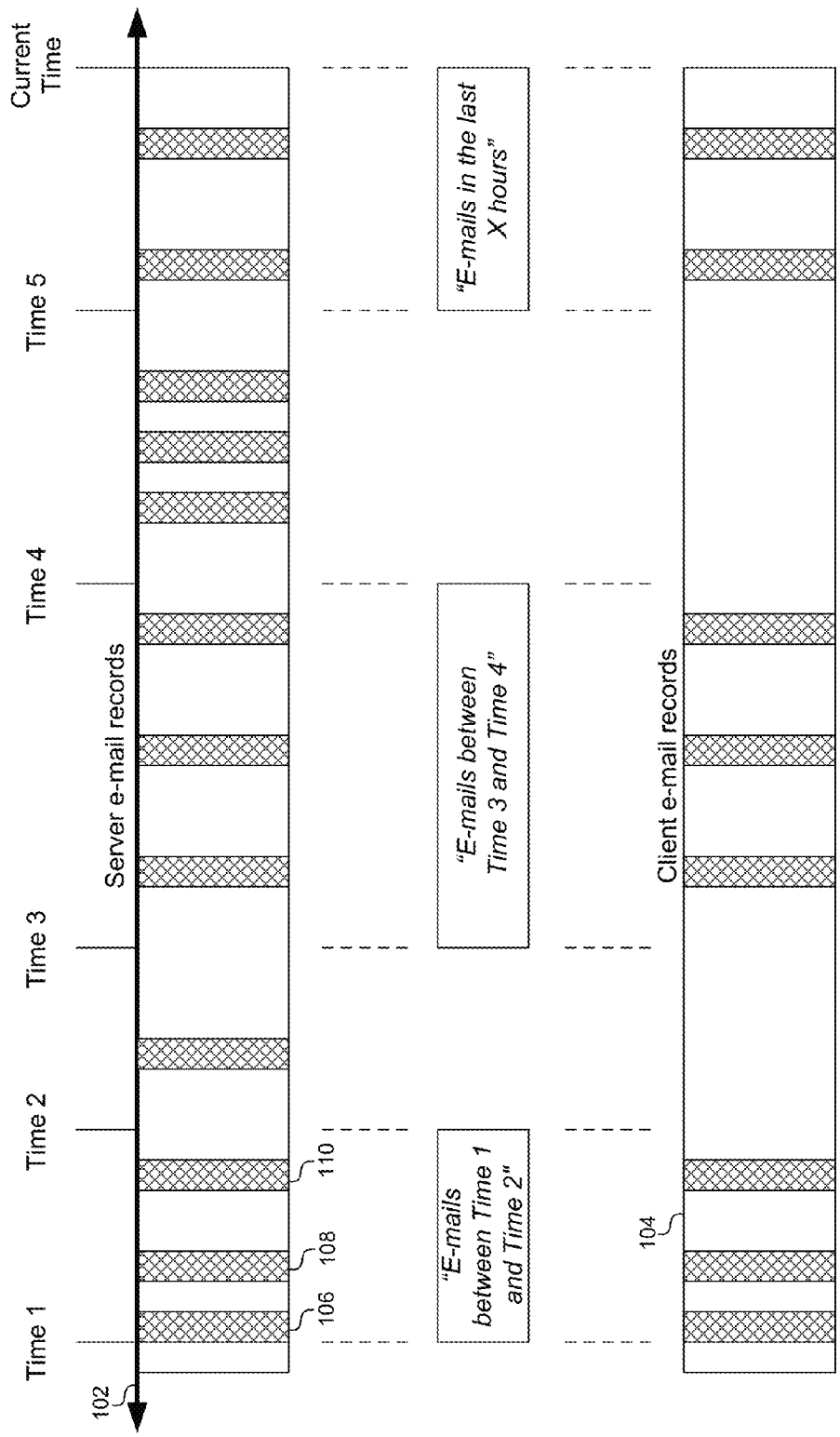
FIG. 1 illustrates a diagram for syncing emails with a client device within discrete time intervals, according to some embodiments.

Described herein, are embodiments for syncing e-mails between an e-mail server and a client device. The e-mails can be synced in one or more discrete time intervals. Some implementations may allow a user to specify that only unread e-mails be synced on the client device. In order to efficiently manage the syncing process, data structures may be used to represent the one or more discrete time intervals that are synced on the client device. For example, a linked list or a tree data structure may be used to represent time intervals with defined start and end times. Some embodiments may use an intermediate e-mail server that is synced with the e-mail server and the client device. The intermediate e-mail server may be configured to respond to e-mail sync requests such that the e-mail server does not require modification.

Traditional e-mail systems include an e-mail server and a client device. The e-mail server stores a master list of all of the e-mails associated with a user e-mail account. The client device may be synced with the e-mail server to download a subset of the master list of e-mails to the client device. Generally, a specified number of the most recent e-mails will be downloaded to the client device. For example, a user may download the 20 most recent e-mails to their smart phone. As the user changes the status of downloaded e-mails to read, marked, deleted, etc., the client device can sync with the e-mail server and update the status of these e-mails in the master list of e-mail stored on the e-mail server.

These traditional e-mail systems do not offer much in the way of flexibility for a user to customize how e-mails are synced. Some customers may wish to exercise more fine-grained control over which e-mails are synced to their client device rather than simply downloading the 20 most recent e-mails. By way of example, on March 30 a user may need to read e-mails received during the week of January 1 of the same year. Using traditional e-mail systems, the user would have to download all of the e-mails between January 1 and March 30. This can include thousands of e-mails, which could take considerable time and mobile bandwidth to download. The embodiments described herein will allow a user to efficiently request e-mails to be synced during a discrete time interval. Therefore, a user could specify that e-mails between January 1 and January 7 be synced with the client device.

Traditional e-mail systems can become very inefficient. Large e-mail servers may service hundreds of millions of user e-mail accounts in very short time intervals. Syncing of unwanted e-mails may increase the usage load on these critical e-mail servers. From the client perspective, downloading thousands of e-mails that may not be of interest and may use significant client resources, particularly when the client device is communicating through a mobile cellular data network. Additionally, most mobile devices are battery-operated, and data transmissions represent some of the most power intensive operations that can be performed by a mobile device. Finally, users may express frustration as they wait for thousand of e-mails to download in order to access relevant e-mails.

FIG. 1 illustrates a diagram for syncing emails with a client device within discrete time intervals, according to some embodiments. Timeline 102 represents e-mail records stored on an e-mail server. Timeline 104 represents e-mail records synced on a client device. As used herein, the term "e-mail server" may include any computer system that serves as an electronic post office for e-mail. E-mail exchange across networks may be passed between e-mail servers running software that is built around agreed-upon, standardized protocols for handling mail messages and any data files that may be included therewith. Exemplary e-mail servers may include Microsoft Exchange® servers, Yahoo Mail®, Gmail®, POP3 servers, IMAP servers, and/or the like. As used herein, the term "client device" may include a computer system that is separate from the e-mail server and used to access e-mails provided by the e-mail server for an e-mail account holder. Client devices may operate client software, such as a Gmail® or Yahoo® email app, Apple Mail®, or Microsoft Outlook®. Some embodiments discussed below may also refer to an intermediate e-mail server. As used herein, the term "intermediate e-mail server" may refer to a server that is distinct or separate from the e-mail server and the client device. The intermediate e-mail server may be specially configured to sync e-mails between the client device and the e-mail server associated with discrete time intervals using the methods described herein.

In FIG. 1, each of the vertical bars in timeline 102 and timeline 104 represents an e-mail record. For example, e-mail 106, e-mail 108, and e-mail 110 represent e-mails stored on the email server between time 1 and time 2. In this example, there are 12 e-mails stored on the e-mail server between time 1 and the current time. It will be understood that most e-mail servers will store a very large number of e-mails for each user account; however, this typically large number of e-mails has been reduced in FIG. 1 for clarity.

Using a client e-mail application, the client device may request e-mails to be synced for one or more time intervals. In FIG. 1, a first time interval may represent e-mails received in the last X hours previous to the current time. This represents a first way to define a time interval. Instead of being initially defined by start time and end time, the user may define the time interval by the current time and a length of time prior to the current time. In some embodiments, this time interval may go forward being defined relative to the current time. In some embodiments, this time interval may be translated into a definite start time and end time, such that is the current time advances that time interval remains the same. For example, if the current time is 5:00 PM and a time interval is defined as e-mails received in the last two hours, the time interval may be defined as 3:00 PM-5:00 PM going forward. In the former case, the time interval may instead be defined as two hours prior to the current time and would change as the current time moves forward.

While syncing the most recent e-mails may be most common, users may also wish to find time intervals that occurred farther in the past. For example, users may wish to sync e-mails received during vacation times. Users may also wish to sync e-mails received during a time leading up to an important meeting. Users may also wish to sync e-mails received during a time interval surrounding an important event. In these and other cases, the user may define such time intervals by providing a start and an end time, such as 9:00 AM Jan. 1, 2013 through 5:00 PM Jan. 5, 2013. Users may also define time intervals relative to events. For example, a user may select a meeting or an event on a calendar application on the client device and request that all e-mails be synced that were received three days prior to the event and two days after the event. In one exemplary interface, a user could select a meeting in the calendar, and then select an option that says "sync e-mails received near this meeting." Intervals may also be defined by selecting an interval of dates/times in a graphical calendar interface on the client device and translating that into a beginning time and an end time for the time interval.

It is important to emphasize that time intervals occurring in the past may be noncontiguous and otherwise unrelated to a time interval relative to the current time. In FIG. 1, the time interval between time 3 and time 4 is not continuous with the time interval between time 5 and the current time. In other words, noncontiguous time intervals may result in gaps that exclude e-mails from being synced. Specifically, time intervals may be defined by a start time and/or an end time that are not relative to and do not include the current time.

FIG. 1 illustrates three discrete time intervals, two of which occur in the past and one which is relative to the current time. When the client device syncs with the e-mail server, the e-mails received within these three time intervals will be synced. As illustrated in FIG. 1, four e-mails that were received between the discrete time intervals are not synced with the client device. Although this example refers to e-mails received during these time intervals, it will be understood that the same principle can apply to e-mails that are associated with these time intervals in any way. For example, a user could choose to sync e-mails sent during the discrete time intervals rather than e-mails received. In some embodiments, a user could choose to sync e-mails that were replied to during the discrete time intervals. Other associations between stored e-mails and a discrete time interval will be apparent to one having skill in the art in light of this disclosure.

Figure 2:
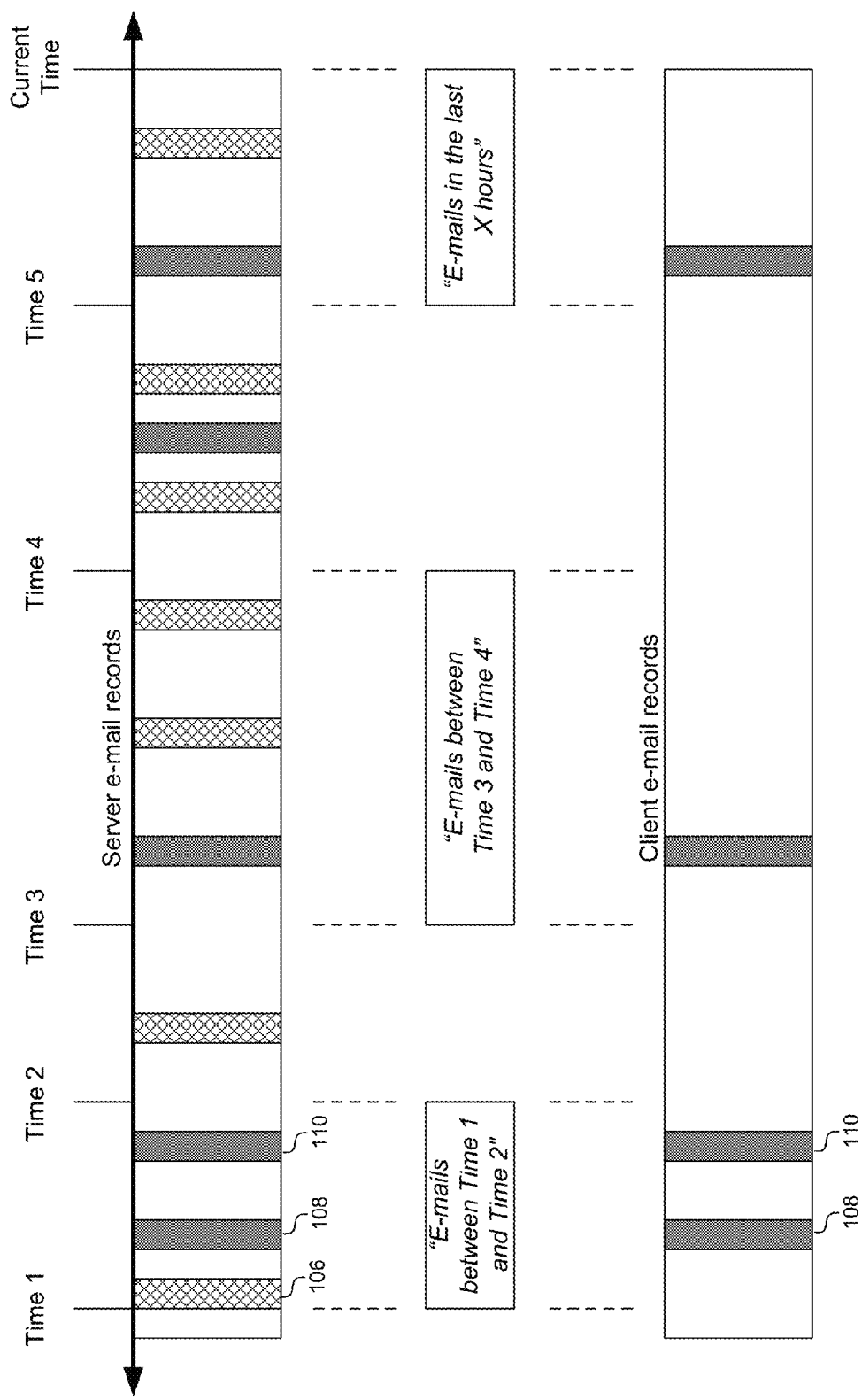
FIG. 2 illustrates a diagram for syncing unread emails with a client device within discrete time intervals, according to some embodiments.

FIG. 2 illustrates a diagram for syncing unread emails with a client device within discrete time intervals, according to some embodiments. In order to further conserve resources, shorten sync time, and increase efficiency, some embodiments may be modified to only sync unread e-mails associated with a discrete time interval. FIG. 2 is similar to FIG. 1 except that some e-mails are marked as read and others are marked as unread. For example, e-mail 106 (and those similarly marked) are marked as read, while e-mail 108 and e-mail 110 (and those similarly marked) are marked as unread. When the sync command is executed, only the unread e-mails that are associated with the discrete time intervals are synced. E-mails 108 and 110 may represent e-mails sent during, received during, replied to during, saved during, and/or otherwise associated with the discrete time interval between time 1 and time 2.

The distinction between read and unread e-mails is a specific example of a more general concept demonstrated by some embodiments. In addition to syncing e-mails that are associated only with defined time intervals, these embodiments may further refine the e-mails to be synced. In FIG. 2, the e-mails are refined by their read/unread status. In other embodiments, other attributes may include syncing only urgent e-mails, syncing only flagged e-mails, syncing only e-mails to (CC or BCC) or from a particular recipient, and/or the like.

Figure 3:
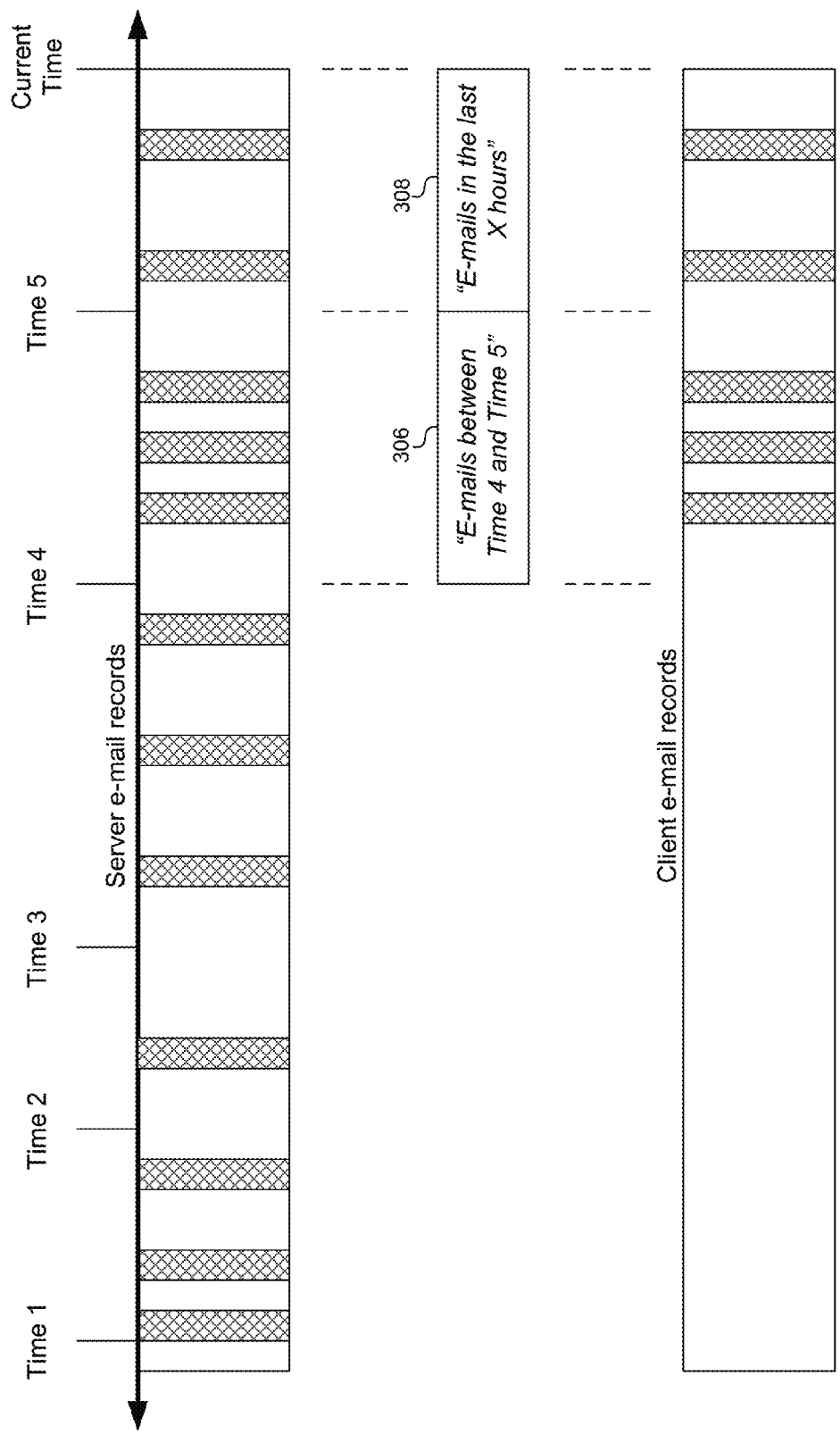
FIG. 3 illustrates a diagram for syncing emails with a client device within successive discrete time intervals, according to some embodiments.

FIG. 3 illustrates a diagram for syncing emails with a client device within successive discrete time intervals, according to some embodiments. This figure expands on the concept of syncing relative to the current time. In some embodiments, syncing relative the current time may generate a rolling time interval window. For example, when the current time was time 5, time interval 306 may have been defined as "two hours prior to the current time" where time 4 is two hours prior to time 5. As the current time moves forward, time interval 306 will move into the past. If a subsequent sync command is executed, a second time interval 308 relative to the current time may be defined relative to the current time (e.g., "two hours prior to the current time"). In some cases, this newly discrete time interval 308 may overlap with the previous time interval 306. This can result in time interval 306 and time interval 308 being merged into a single time interval. This case will be discussed further below in relation to data structures for storing time intervals. In some embodiments, time interval 306 and time interval 308 may remain separate time intervals.

In an alternative case (not shown), time interval 306 and time interval 308 might not overlap, and might not be adjacent. In this case, both time intervals would remain separate. As time moves forward, multiple time intervals may be created depending on the frequency at which sync operations are executed. For example, each of the time intervals in FIG. 1 may have been created relative to the current time and triggered by a sync operation. In yet another alternative, the user may choose to only allow a single time interval to be perpetuated relative to the current time interval. For example, these embodiments would remove interval 306 and replace it with interval 308. This feature could be used to prevent generating a new time interval every time that a user synced the most recent emails.

Figure 4:
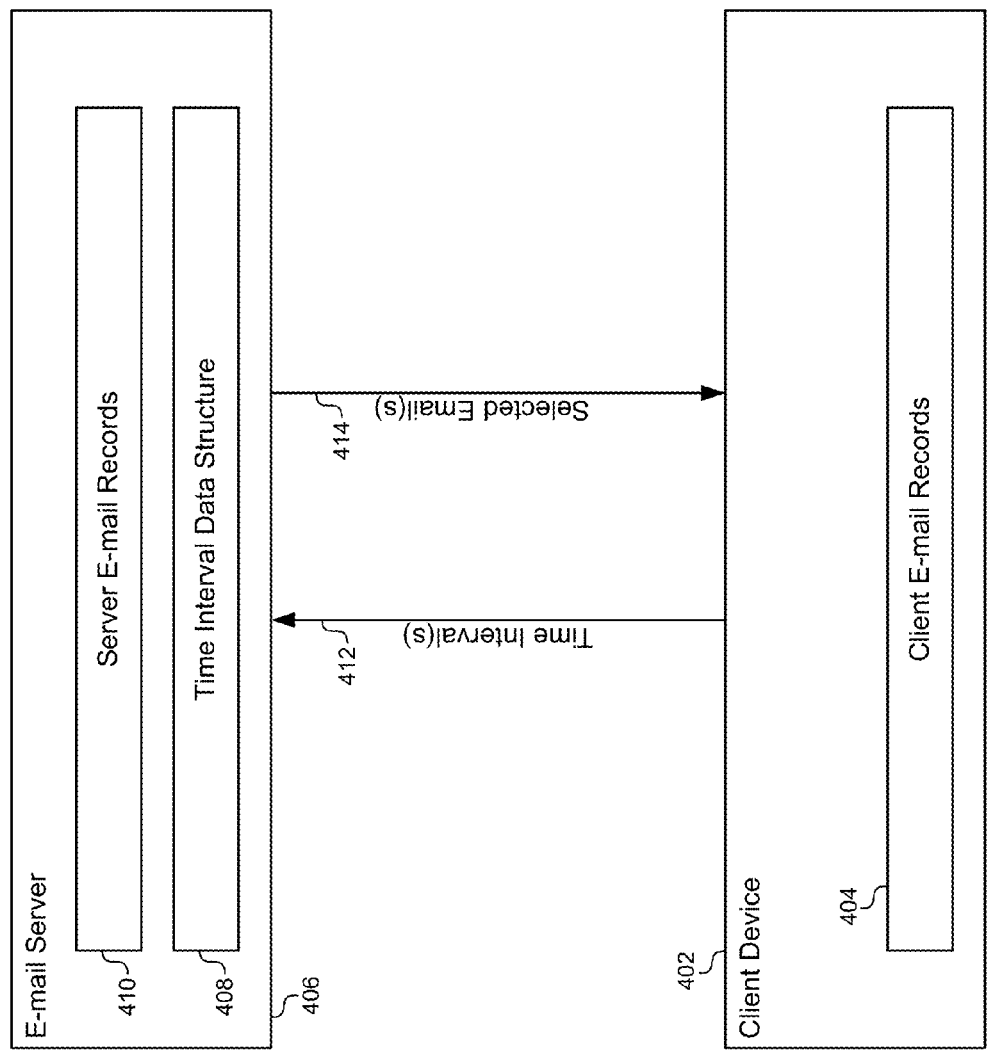
FIG. 4 illustrates an e-mail system where the e-mail server stores time intervals, according to some embodiments.
Figure 5:
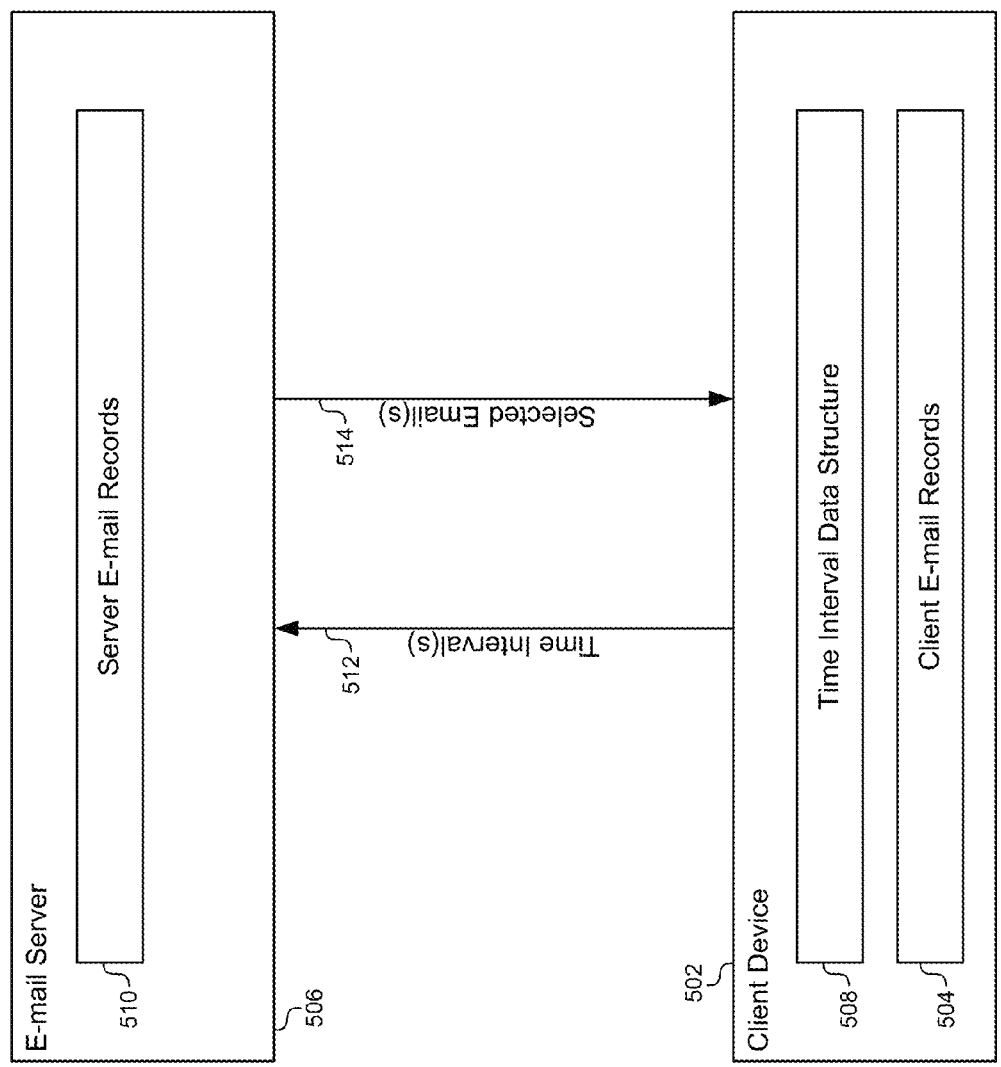
FIG. 5 illustrates an e-mail system where the client device stores time intervals, according to some embodiments.
Figure 6:
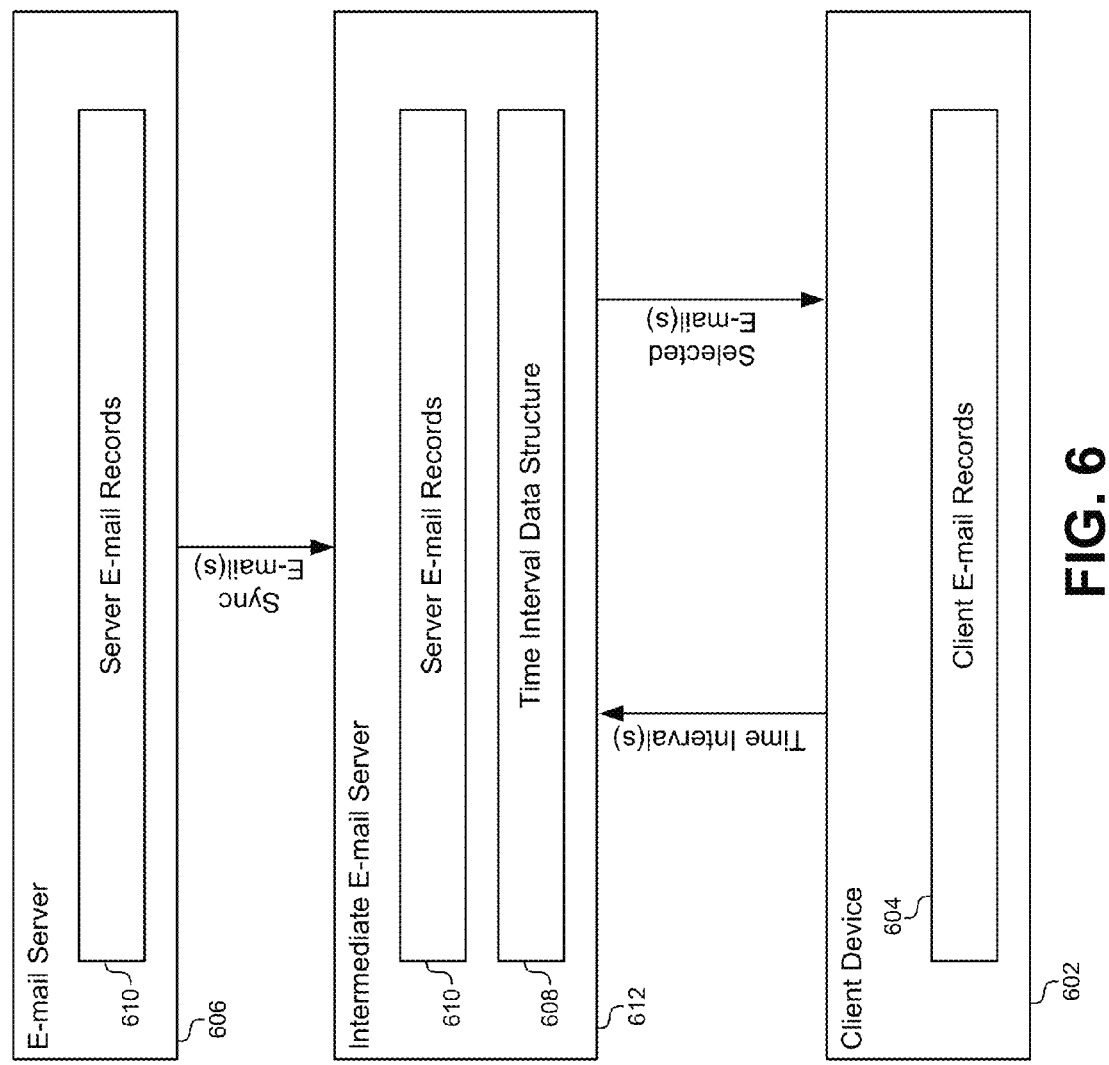
FIG. 6 illustrates an e-mail system where an intermediate server stores time intervals and syncs e-mails associated with time intervals, according to some embodiments.

FIGS. 4-6 illustrate block diagrams of email systems according to various embodiments. In some embodiments, a dedicated hardware platform may be designed to implement the functionality described herein. This dedicated hardware may be designed using processors, memories, microcontrollers, buses, communication ports, network access ports, adapters, digital circuits, analog circuits, instruction sets, and/or the like, that are well-known in the art and would be readily understood by one having skill in the art. The block diagrams represent an abstraction of the functions that may be implemented using these types of hardware. After reading this disclosure, one having skill in the art could use these well-known circuit elements to construct the device shown in these diagrams to implement these methods and systems.

A number of different hardware configurations may be used to implement e-mail syncing with the discrete time intervals. FIG. 4 illustrates an e-mail system where the e-mail server stores time intervals, according to some embodiments. An e-mail server 406 stores the server e-mail records 410 as normal. The e-mail server 406 also stores a time interval data structure 408 that stores and organizes the time intervals to be synced with the client device. In this configuration, the e-mail server 406 stores, updates, and accesses the time interval data structure 408. This may require the e-mail server 460 be customized to implement these embodiments.

In this configuration, the client device 402 can define new time intervals 412 to be synced with the server e-mail records 410. The new time intervals 412 can be sent to the e-mail server 406, where the time interval data structure 408 can be updated to include the new time intervals 412. The time interval data structure 408 may then include the new time intervals 412, as well as any previously synced time intervals sent from the client device 402 to the e-mail server 406. The e-mail server 406 can then access the time interval data structure 408 to then extract e-mails from the server e-mail records 410 that are associated with the time intervals in the time interval data structure 408. The selected e-mails 414 can then be sent to the client device and added to the client e-mail records 404.

In some embodiments, the time interval data structure 408 can also be present on the client device 402. In some cases, this means that the time interval data structure 408 may exist both on the client device 402 as well as the e-mail server 406 (and any intermediate e-mail server as described below). This configuration may avoid sending any request to the e-mail server 406 (and/or intermediate e-mail server) in the cases where a particular discrete time interval is already synced with the client device 402. This may save data traffic between the client device 602 and the e-mail server 406 (and/or intermediate e-mail server).

FIG. 5 illustrates an e-mail system where the client device stores time intervals, according to some embodiments. This embodiment is similar to the embodiment of FIG. 4, except that the client device 502 manages the time interval data structure 508 instead of the e-mail server 506. In this embodiment, new time intervals may be defined at the client device 502 and added to the time interval data structure 508. Then, all of the time intervals 512 in the time interval data structure 508 may be sent to the e-mail server 506. The e-mail server 506 can access the server e-mail records 510 and extract selected e-mails 514 that are associated with the time intervals 512. The selected e-mails 514 can be returned to the client device 502 and stored in the client e-mail records 504. This embodiment offers the advantage of not requiring the e-mail server to be customized to manage the time interval data structure 508. However, all the time intervals 512 may be sent to the e-mail server 506, thus increasing the bandwidth usage. Alternatively, the client device 502 may determine which of the time intervals stored in the time interval data structure 508 need to be synced with the client e-mail records 504. In this case, a subset of the time intervals in the time interval data structure 508 may be sent to the e-mail server 506 instead of all of the time intervals in the time interval data structure 508.

FIG. 6 illustrates an intermediate server that stores time intervals and syncs e-mails associated with time intervals, according to some embodiments. The key difference between the embodiment of FIG. 6 in the embodiments of FIG. 4 and FIG. 5 is the addition of an intermediate e-mail server 612. In this embodiment, the intermediate e-mail server 612 bridges the gap between an existing e-mail server 606 and an existing client device 604. The e-mail server 606 can maintain the server e-mail records 610 as usual. The e-mail server 606 may also sync the server e-mail records 610 with the intermediate server 612 as usual. The intermediate e-mail server 612 may maintain a comprehensive list of server e-mail records 610 that are synced with the e-mail server 606. The intermediate e-mail server 612 may also manage the time interval data structure 608.

The client device 602 can receive an input or otherwise automatically generate one or more time intervals for which associated e-mail should be synced. These time intervals can be sent to the intermediate e-mail server 612 where the intermediate server updates the time interval data structure 608. The intermediate e-mail server 612 can then select e-mails from the server e-mail records 610 that are associated with the time intervals and send the selected e-mails to the client e-mail records 604 on the client device 602.

Note that in some embodiments, the intermediate e-mail server 612 can keep track of which e-mails associated with existing time intervals in the time interval data structure 608 have already been synced. For example, if time intervals sent from the client device 602 overlap with or are included entirely within existing time intervals in the time interval data structure 608, then e-mails associated with these time intervals can be excluded from the selected e-mails sent back to the client device 602. Thus, data traffic can be minimized between the client device 602 and the intermediate e-mail server 612.

It should also be noted that when e-mails are replied to, forwarded, deleted, or otherwise updated by the client device 602 these e-mails can be transmitted to the intermediate e-mail server 612. The intermediate e-mail server 612 can then determine which of those e-mails need to be sent to the e-mail server 606.

Figure 7:
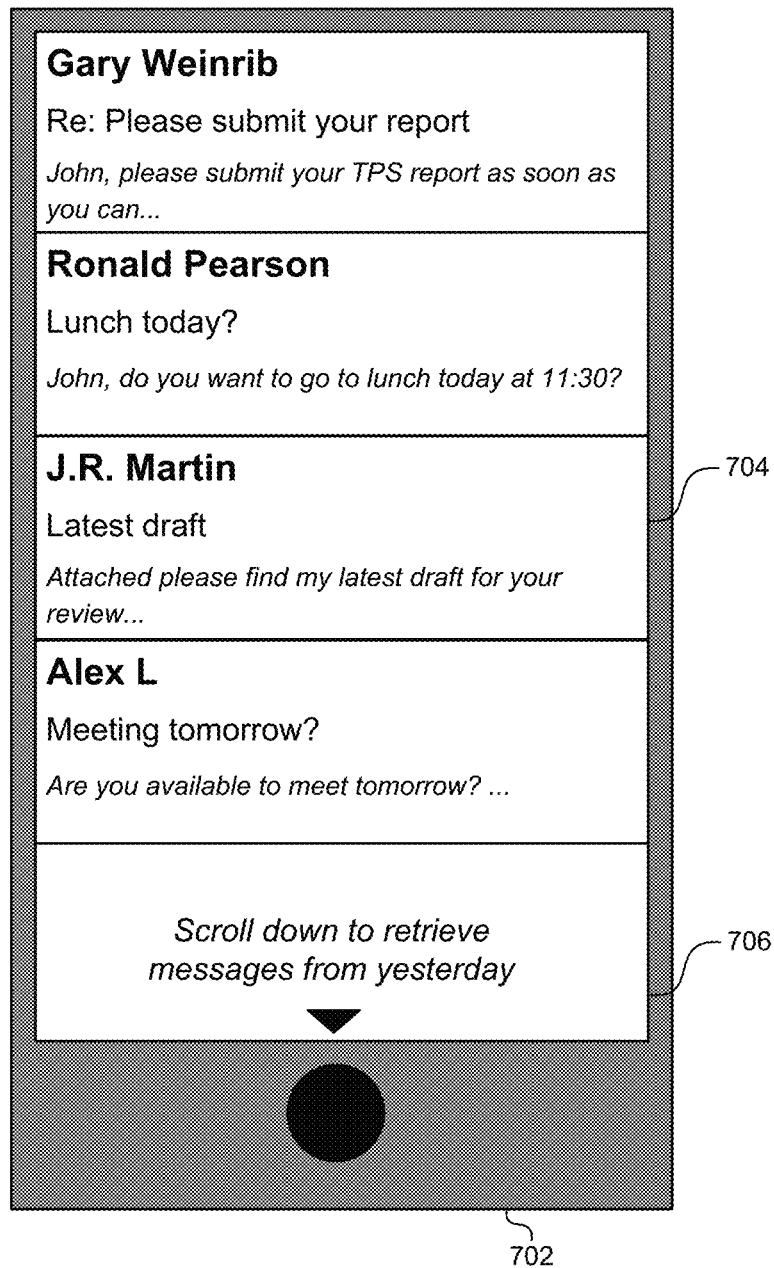
FIG. 7 illustrates a user interface on a client device that can be used to receive e-mails from the e-mail server or the intermediate server, according to some embodiments.

FIG. 7 illustrates a user interface on a client device that can be used to receive e-mails from the e-mail server or the intermediate server, according to some embodiments. The client device 702 may comprise a smart phone, a PDA, a notebook computer, and/or the like. The user interface, such as an e-mail client app, can display e-mails 704 that have been received by the client device 702. As described above, the e-mails 704 may be limited to e-mails associated with one or more discrete time intervals.

In order to request e-mails from an additional time interval, the user interface may provide a calendar tool that allows a user to enter a start date/time and an end date/time to define a new discrete time interval. In the embodiment illustrated by FIG. 7, intuitive graphical controls may also be provided to quickly define new discrete time intervals. For example, control 706 allows the user to continue scrolling down in order to request e-mail messages from the previous day. A new discrete time interval beginning at 12:00 PM the previous day and ending at 11:59 PM may thereby be defined and e-mail messages corresponding to that time interval may be retrieved by the client device 702 from the e-mail server or the intermediate server, depending on the embodiment.

Some embodiments may use a default time interval that is defined each time the client device 702 is used to browse receive e-mails 704. For example, when opening the e-mail client, a new time interval may be defined comprised of the current day, the current hour, the last half-hour, and/or the like. This default time interval may be set by a user and stored as a user preference. In other embodiments, no default time interval might be active, and instead a user must explicitly define a new discrete time interval and request e-mails therefrom in order to receive those e-mails from the e-mail server or intermediate server.

Depending upon the particular embodiment, a representation of the discrete time intervals for which e-mails should be transferred to the client device can be stored at the client device, at the intermediate server, and/or at the e-mail server. Many different data structures may be used to efficiently represent discrete time intervals. FIG. 8A illustrates a linked list data structure for storing discrete time intervals, according to some embodiments. In this embodiment, each node in the linked list represents a discrete time interval. By way of example, each node could store a first date/time and a second date/time representing the start and end of the discrete time interval. Various embodiments may store dates and times according to any level of precision, such as a "mm/dd/yyyy, hh:mm:ss" format. For ease of explanation, these dates/ times are represented in the attached figures as decimal numbers. It will be understood that each of the decimal numbers could be changed to a more readily used date/time format and the same principles would still apply.

In FIG. 8A, the linked list data structure includes five nodes 802, 804, 806, 808, 810, each representing a discrete time interval for which e-mails should be synced to the client device. Node 812 represent the time interval from 78 to 222, and node 814 represents the time interval from 390 to 410. These two nodes may represent two new discrete time intervals for which e-mails should be requested by the client device. E-mails associated with nodes 812 and 814 can be synced to the client device, and nodes 812 and 814 can be added to the linked list data structure.

FIG. 8B illustrates the linked list data structure after new discrete time interval nodes have been inserted, according to some embodiments. To insert a new node, a process can traverse the linked list and determine where the new node should be inserted. In cases where the new time interval overlaps with existing time intervals, the new node can change the intervals represented by existing nodes. For example, node 812 completely overlaps node 802 and node 804. Node 812 is also adjacent to node 106. Therefore, node 802 and node 804 can be removed, and node 806 can have the start time changed from 222 to 78. This new node is represented by node 816. In cases where the new node is not adjacent to and does not overlap with any existing notes, the new node can be simply inserted into the linked list. For example, node 814 can be inserted between node 808 and node 810.

Figure 9A:
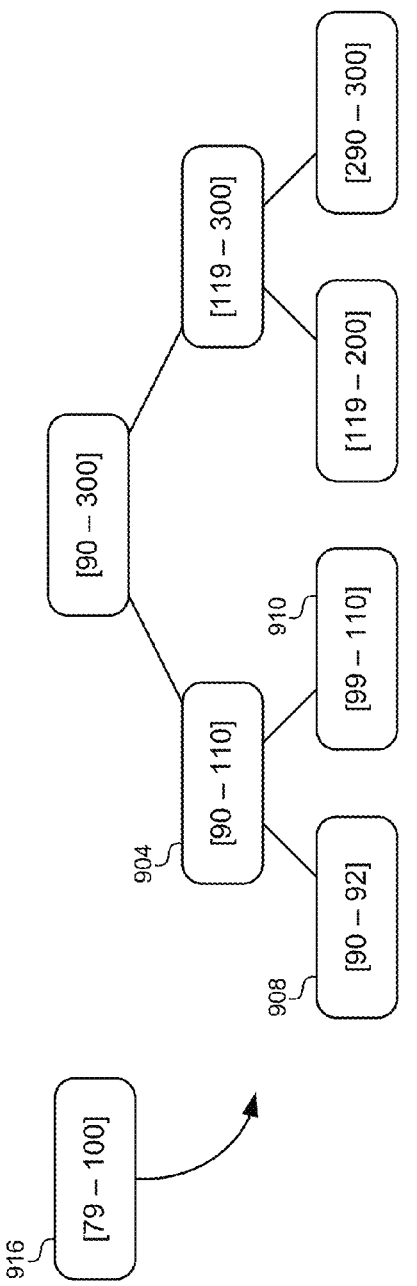
FIG. 9A represents a binary tree data structure for representing time intervals, according to some embodiments.

By way of further example, other data structures can also be used to represent a collection of discrete time intervals. FIG. 9A represents a binary tree data structure for representing time intervals, according to some embodiments. Similar to the nodes of FIGS. 8A-8B, each node in the tree data structure can represent a discrete time interval using a start time and an end time. Each parent node represents a range that includes all child nodes. For example, node 904 represents the range between 90 and 110, as both child nodes 908, 910 represent ranges between 90 and 110.

Figure 9B:
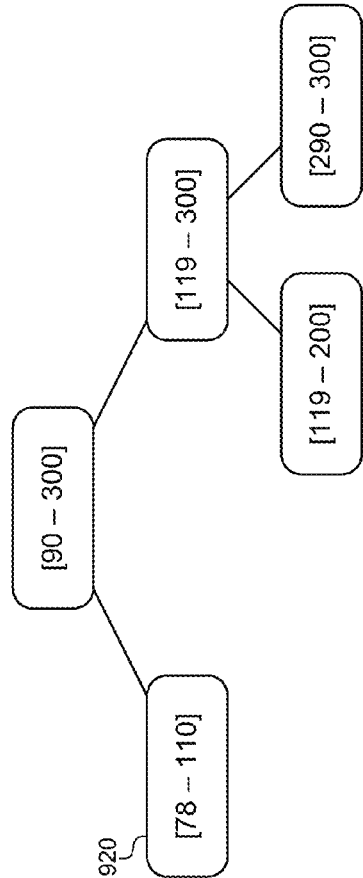
FIG. 9B represents the binary tree data structure after inserting a new node, according to some embodiments.

In order to insert a new node, the binary tree can be traversed, and, as was the case with the linked list, the new node can be inserted or existing nodes can be changed or removed based on the interval represented by the new node. FIG. 9B represents the binary tree data structure after inserting a new node, according to some embodiments. Node 916 representing the discrete time interval between 79 and 100 overlaps with the existing nodes 908 and 910. Therefore, node 920 subsumes nodes 908 and 910 and updates the lower bound on the range to be 78. The binary tree data structure may be advantageous because the computational complexity for inserting new nodes and accessing existing nodes is O(log n).

Figure 10:
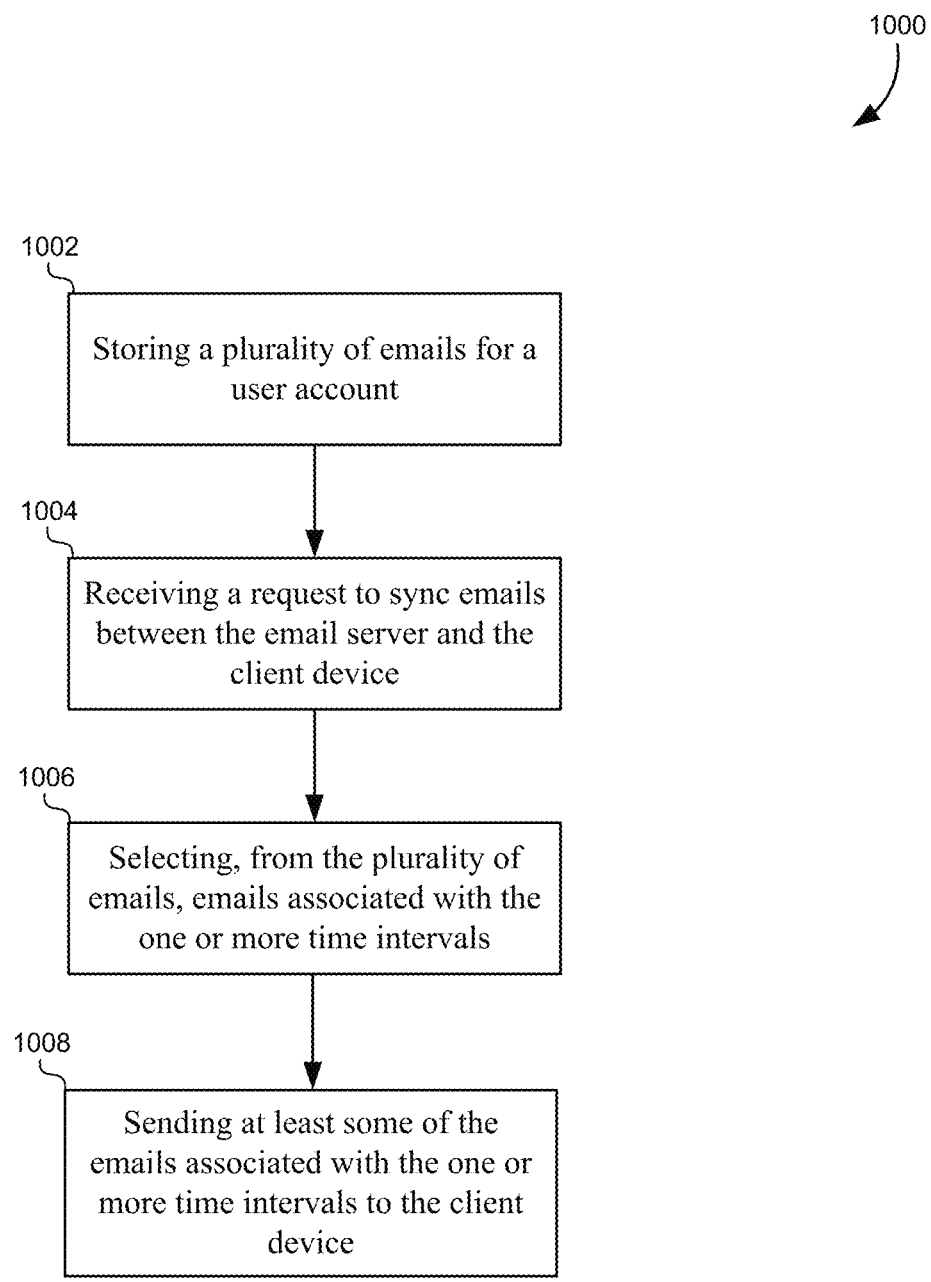
FIG. 10 illustrates a flowchart of a method for syncing e-mails between an e-mail server and client device, according to some embodiments.

FIG. 10 illustrates a flowchart of a method for syncing e-mails between an e-mail server and client device, according to some embodiments. The method may include storing a plurality of e-mails for user account (1002). The plurality of e-mails may generally be stored by a computer system. In some embodiments, the computer system may represent an e-mail server. In other embodiments, the computer system may represent an intermediate server as described above. In these embodiments, the e-mail server and the intermediate server may represent separate and distinct servers. The intermediate server may be added between the e-mail server and the client device such that altering the e-mail server is not necessary. The e-mail server and the intermediate server may sync all of the e-mails in the user account such that the intermediate server has a full record of e-mails associated with the user account.

The method may further include receiving a request to sync e-mails between the e-mail server and the client device (1004). The computer system receiving the request to sync e-mails may be either the e-mail server or the intermediate server, depending on the embodiment. The request may include one or more discrete time intervals for which e-mails should be synced. The time intervals may be represented by a start date/time and/or an ending date/time. In some embodiments, the request may include only new time intervals for which e-mails have not previously been requested, while other embodiments may also include previously synced time intervals and/or new time intervals that overlap with or are adjacent to previously synced time intervals.

Depending upon the particular embodiment, the method may further include storing a data structure comprising time intervals that have been associated with previous sync requests from the client device, and updating the data structure to include the one or more time intervals received as part of the current request. As described above, the data structure may include a linked list comprising a plurality of nodes, where each of the nodes represents a single time interval represented by a start time and/or an end time. The data structure may also include a tree data structure comprising a plurality of nodes to represent the one or more time intervals.

The method may additionally include selecting, from the plurality of e-mails, e-mails associated with the one or more time intervals (1006). The computer system performing this method can search the full set of e-mails for the user account and select those that are associated with the one or more time intervals. As described above, the association may include e-mails that were sent during the time intervals, e-mails that were received during the time intervals, e-mails that were replied to during the time intervals, e-mails that were saved during the time intervals, and/or any other time-related characteristic of an e-mail that occurs during the time intervals.

The method may also include sending at least some of the e-mails associated with the one or more time intervals to the client device (1008). Every e-mail associated with the one or more time intervals may be sent to the client device. In other embodiments, only previously unsynced e-mails may be sent to the client device. In some embodiments, only unread e-mails associated with the time intervals may be sent to the client device.

It should be appreciated that the specific steps illustrated in FIG. 10 provide particular methods of selectively syncing e-mails according to various embodiments of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system, such as those described below. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 11:
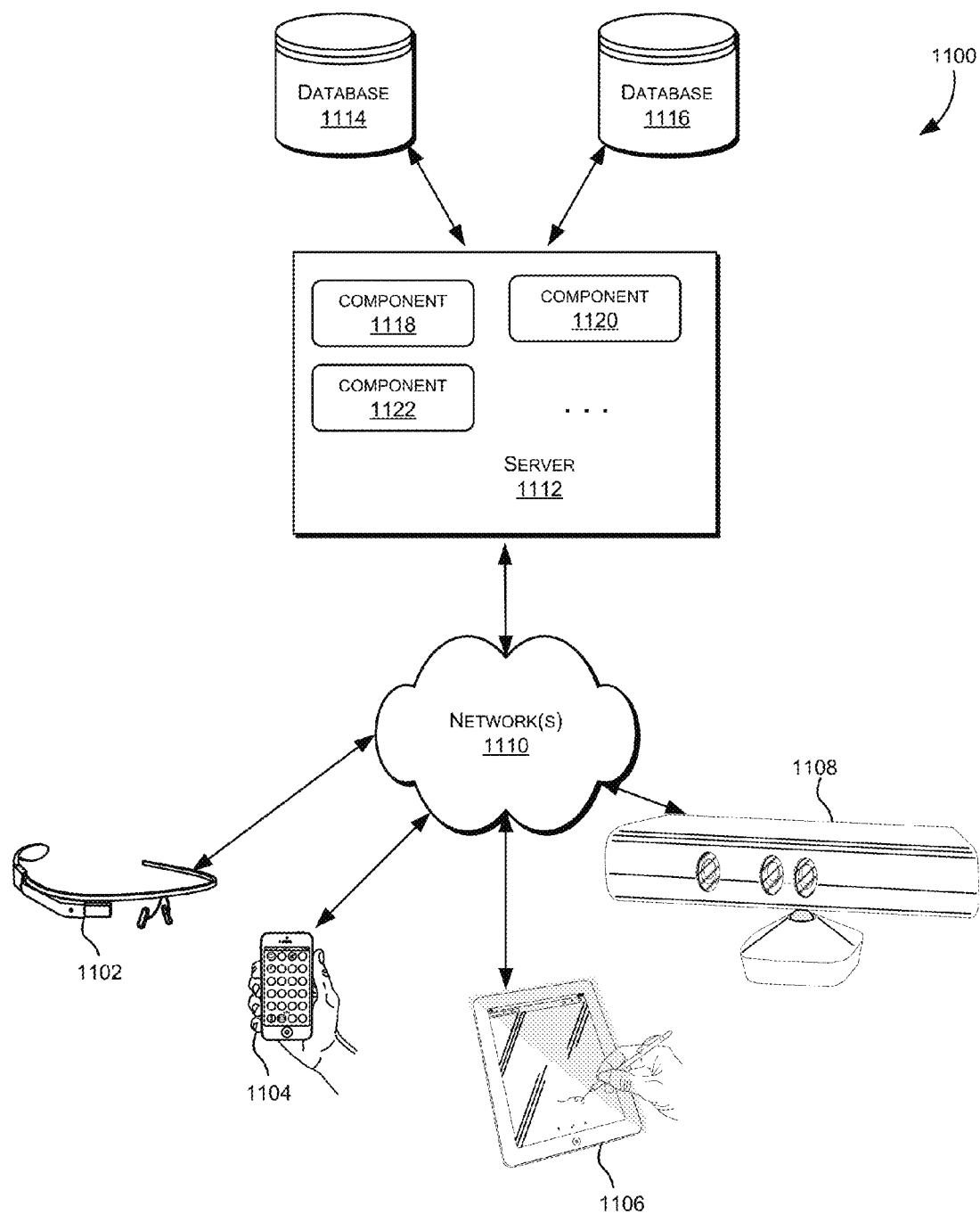
FIG. 11 illustrates a simplified block diagram of a distributed system for implementing some of the embodiments.

FIG. 11 depicts a simplified diagram of a distributed system 1100 for implementing one of the embodiments. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications provided by one or more of the components of the system. In some embodiments, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in the figure, the software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in the figure is thus one example of a distributed system for implementing an embodiment system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands.

Figure 12:
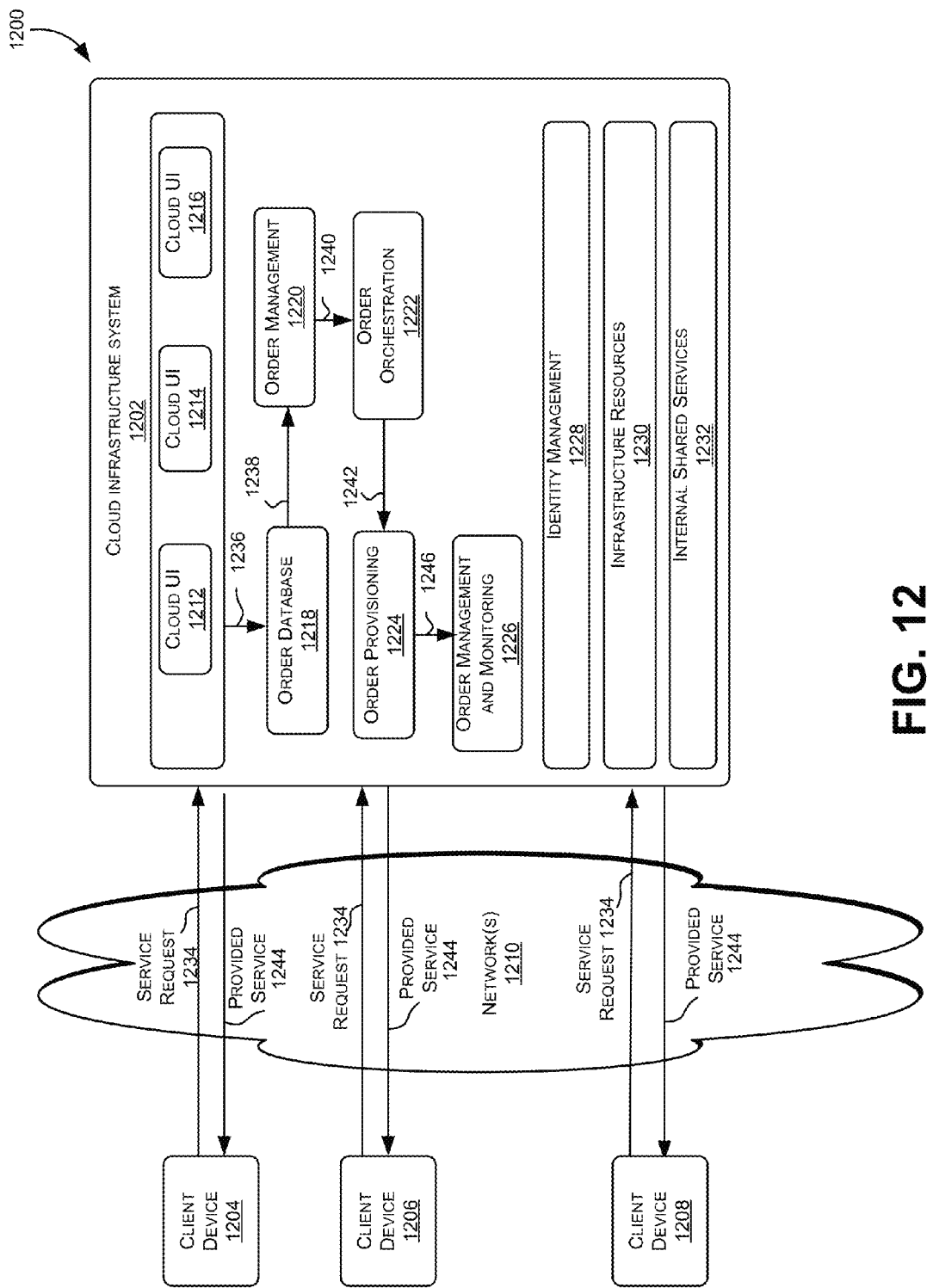
FIG. 12 illustrates a simplified block diagram of components of a system environment by which services provided by the components of an embodiment system may be offered as cloud services.

FIG. 12 is a simplified block diagram of one or more components of a system environment 1200 by which services provided by one or more components of an embodiment system may be offered as cloud services, in accordance with an embodiment of the present disclosure. In the illustrated embodiment, system environment 1200 includes one or more client computing devices 1204, 1206, and 1208 that may be used by users to interact with a cloud infrastructure system 1202 that provides cloud services. The client computing devices may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202.

It should be appreciated that cloud infrastructure system 1202 depicted in the figure may have other components than those depicted. Further, the embodiment shown in the figure is only one example of a cloud infrastructure system that may incorporate an embodiment of the invention. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above for 1102, 1104, 1106, and 1108.

Although exemplary system environment 1200 is shown with three client computing devices, any number of client computing devices may be supported. Other devices such as devices with sensors, etc. may interact with cloud infrastructure system 1202.

Network(s) 1210 may facilitate communications and exchange of data between clients 1204, 1206, and 1208 and cloud infrastructure system 1202. Each network may be any type of network familiar to those skilled in the art that can support data communications using any of a variety of commercially-available protocols, including those described above for network(s) 1110.

Cloud infrastructure system 1202 may comprise one or more computers and/or servers that may include those described above for server 1112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform.

In some embodiments, resources in cloud infrastructure system 1202 may be shared by multiple users and dynamically re-allocated per demand. Additionally, resources may be allocated to users in different time zones. For example, cloud infrastructure system 1230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 and by the services provided by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1202, and the like.

In one embodiment, as depicted in the figure, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In exemplary operation 1234, a customer using a client device, such as client device 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud User Interface (UI), cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

After an order has been placed by the customer, the order information is received via the cloud UIs, 1212, 1214 and/or 1216.

At operation 1236, the order is stored in order database 1218. Order database 1218 can be one of several databases operated by cloud infrastructure system 1218 and operated in conjunction with other system elements.

At operation 1238, the order information is forwarded to an order management module 1220. In some instances, order management module 1220 may be configured to perform billing and accounting functions related to the order, such as verifying the order, and upon verification, booking the order.

At operation 1240, information regarding the order is communicated to an order orchestration module 1222. Order orchestration module 1222 may utilize the order information to orchestrate the provisioning of services and resources for the order placed by the customer. In some instances, order orchestration module 1222 may orchestrate the provisioning of resources to support the subscribed services using the services of order provisioning module 1224.

In certain embodiments, order orchestration module 1222 enables the management of business processes associated with each order and applies business logic to determine whether an order should proceed to provisioning. At operation 1242, upon receiving an order for a new subscription, order orchestration module 1222 sends a request to order provisioning module 1224 to allocate resources and configure those resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. Order orchestration module 1222 may thus be isolated from implementation details, such as whether or not services and resources are actually provisioned on the fly or pre-provisioned and only allocated/assigned upon request.

At operation 1244, once the services and resources are provisioned, a notification of the provided service may be sent to customers on client devices 1204, 1206 and/or 1208 by order provisioning module 1224 of cloud infrastructure system 1202.

At operation 1246, the customer's subscription order may be managed and tracked by an order management and monitoring module 1226. In some instances, order management and monitoring module 1226 may be configured to collect usage statistics for the services in the subscription order, such as the amount of storage used, the amount data transferred, the number of users, and the amount of system up time and system down time.

In certain embodiments, cloud infrastructure system 1200 may include an identity management module 1228. Identity management module 1228 may be configured to provide identity services, such as access management and authorization services in cloud infrastructure system 1200. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

Figure 13:
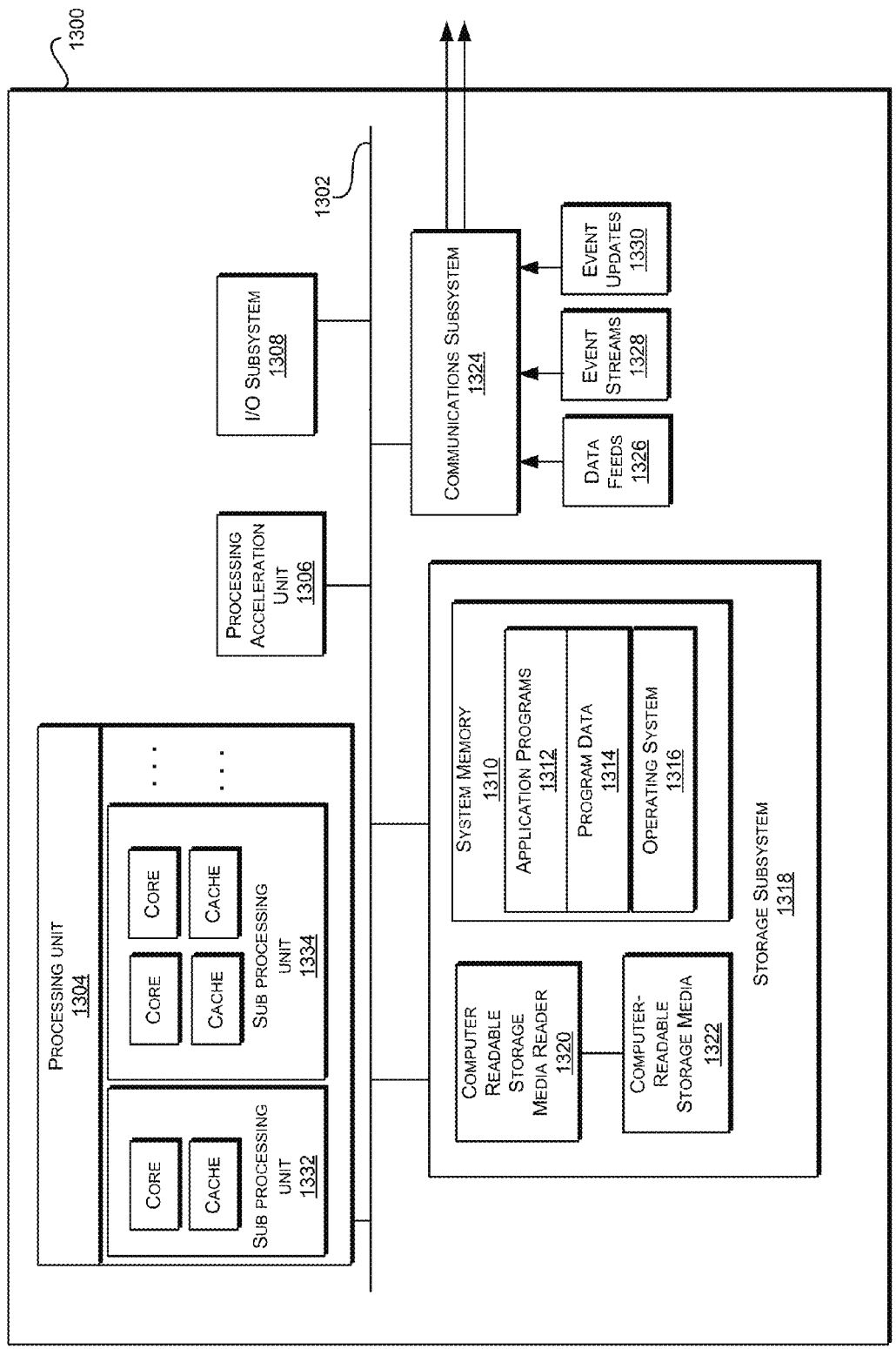
FIG. 13 illustrates an exemplary computer system, in which various embodiments may be implemented.

FIG. 13 illustrates an exemplary computer system 1300, in which various embodiments of the present invention may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present invention.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of explanation, numerous specific details have been set forth in order to provide a thorough understanding of various embodiments of the present invention. It will be apparent, however, to one skilled in the art that embodiments of the present invention may be practiced without some of these specific details. In other instances, well-known structures and devices may have been shown in block diagram form.

This description has provided exemplary embodiments only, and is not intended to limit the scope, applicability, or configuration of the disclosure. Rather, this description of the exemplary embodiments provides those skilled in the art with an enabling description for implementing an exemplary embodiment. It should be understood that various changes may be made in the function and arrangement of elements without departing from the spirit and scope of the invention as set forth in the appended claims.

Specific details have been given in the description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "non-transitory, computer-readable medium" includes, but is not limited to portable or fixed storage devices, optical storage devices, and various other mediums capable of storing instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Additionally, for the purposes of illustration, methods may have been described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of syncing emails between an email server and a client device, the method comprising:
   storing, by a computer system, a plurality of emails for a user account;
   receiving, by the computer system, a request to sync emails between the email server and the client device, wherein the request comprises a plurality of non-contiguous time intervals;
   selecting, by the computer system and from the plurality of emails, emails associated with the plurality of non-contiguous time intervals; and
   sending, by the computer system, at least some of the emails associated with the plurality of non-contiguous time intervals to the client device, and not sending any emails that fall outside of the plurality of non-contiguous time intervals.

2. The method of claim 1, wherein the computer system comprises an intermediate server that is separate from the email server and separate from the client device.

3. The method of claim 2, further comprising syncing, by the intermediate server, the plurality of emails with the email server.

4. The method of claim 1, wherein the computer system comprises the email server.

5. The method of claim 1, further comprising:
   storing, by the computer system, a data structure comprising discrete time intervals that have been previously associated with sync requests from the client device; and
   updating the data structure to include the plurality of non-contiguous time intervals.

6. The method of claim 1, wherein the plurality of non-contiguous time intervals comprises at least one discrete time interval that does not include a current time.

7. The method of claim 1, wherein the plurality of non-contiguous time intervals comprises at least one discrete time interval that less than one day.

8. The method of claim 1, wherein the plurality of non-contiguous time intervals comprises at least one discrete time interval that is designated in a number of hours.

9. The method of claim 1, wherein the at least some of the emails associated with the plurality of non-contiguous time intervals that are sent to the client device comprise only unread emails.

10. A non-transitory computer-readable medium comprising a sequence of instructions which, when executed by one or more processors, causes the one or more processors to perform operations comprising:
    storing a plurality of emails for a user account;
    receiving a request to sync emails between an email server and a client device, wherein the request comprises a plurality of non-contiguous time intervals;
    selecting, from the plurality of emails, emails associated with the plurality of non-contiguous time intervals; and
    sending at least some of the emails associated with the plurality of non-contiguous time intervals to the client device, and not sending any emails that fall outside of the plurality of non-contiguous time intervals.

11. The non-transitory computer-readable medium of claim 10, wherein the operations further comprise syncing the plurality of emails with the email server.

12. The non-transitory computer-readable medium of claim 10, further comprising:
    storing a data structure comprising discrete time intervals that have been previously associated with sync requests from the client device; and
    updating the data structure to include the plurality of non-contiguous time intervals.

13. The non-transitory computer-readable medium of claim 12, wherein:
    the data structure comprises a tree data structure comprising a plurality of nodes;
    each of the plurality of nodes represents one of the discrete time intervals; and
    each of the discrete time intervals is represented by a start time and an end time.

14. The non-transitory computer-readable medium of claim 10, wherein the at least some of the emails associated with the plurality of non-contiguous time intervals that are sent to the client device comprise only unread emails.

15. An intermediate server for syncing emails in discrete time intervals between an email server and a client device, the intermediate server comprising:
    one or more processors; and
    a memory communicatively coupled with and readable by the one or more processors and comprising a sequence of instructions which, when executed by the one or more processors, cause the one or more processors to perform operations comprising:
       storing a plurality of emails for a user account;
       receiving a request to sync emails between an email server and a client device, wherein the request comprises a plurality of non-contiguous time intervals;
       selecting, from the plurality of emails, emails associated with the plurality of non-contiguous time intervals; and
       sending at least some of the emails associated with the plurality of non-contiguous time intervals to the client device, and not sending any emails that fall outside of the plurality of non-contiguous time intervals.

16. The server of claim 15, further comprising syncing the plurality of emails with the email server.

17. The server of claim 15, further comprising:
    storing a data structure comprising discrete time intervals that have been previously associated with sync requests from the client device; and
    updating the data structure to include the plurality of non-contiguous time intervals.

18. The server of claim 17, wherein:
    the data structure comprises a tree data structure comprising a plurality of nodes;
    each of the plurality of nodes represents one of the discrete time intervals; and each of the discrete time intervals is represented by a start time and an end time.

19. The server of claim 17, wherein:
the data structure comprises a linked list comprising a plurality of nodes;
each of the plurality of nodes represents one of the discrete time intervals; and
each of the discrete time intervals is represented by a start time and an end time.

\* \* \* \* \*

UNITED STATES PATENT AND TRADEMARK OFFICE
CERTIFICATE OF CORRECTION

PATENT NO. : 9,787,769 B2  
APPLICATION NO. : 14/451155  
DATED : October 10, 2017  
INVENTOR(S) : Kumar et al.

Page 1 of 1

It is certified that error appears in the above-identified patent and that said Letters Patent is hereby corrected as shown below:

On the Title Page

Column 2, under Other Publications, Line 8, delete "en" and insert -- on --, therefor.

On page 2, Column 1, under Other Publications, Line 25, delete "Alignmnent,"" and insert -- Alignment," --, therefor.

In the Specification

In Column 19, Line 3, delete "Ski®" and insert -- Siri® --, therefor.

In Column 20, Line 50, delete "(SSD)" and insert -- (SSDs) --, therefor.

Signed and Sealed this  
Twenty-ninth Day of May, 2018

Andrei Iancu  
*Director of the United States Patent and Trademark Office*